US010711356B2

(12) United States Patent
Bulan et al.

(10) Patent No.: US 10,711,356 B2
(45) Date of Patent: *Jul. 14, 2020

(54) OXYGEN-CONSUMING ELECTRODE AND METHOD FOR PRODUCING SAME

(71) Applicant: Covestro Deutschland AG, Leverkusen (DE)

(72) Inventors: Andreas Bulan, Langenfeld (DE); Jürgen Kintrup, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 309 days.

This patent is subject to a terminal disclaimer.

(21) Appl. No.: 15/510,286

(22) PCT Filed: Aug. 28, 2015

(86) PCT No.: PCT/EP2015/069723
§ 371 (c)(1),
(2) Date: Mar. 10, 2017

(87) PCT Pub. No.: WO2016/037866
PCT Pub. Date: Mar. 17, 2016

(65) Prior Publication Data
US 2017/0298524 A1 Oct. 19, 2017

(30) Foreign Application Priority Data
Sep. 12, 2014 (DE) .................. 10 2014 218 367

(51) Int. Cl.
C25B 11/03 (2006.01)
H01M 4/86 (2006.01)
H01M 4/96 (2006.01)
C25B 1/46 (2006.01)
H01M 4/88 (2006.01)
C25B 1/34 (2006.01)
H01M 4/90 (2006.01)
C25B 11/04 (2006.01)
H01M 8/083 (2016.01)
H01M 12/06 (2006.01)
H01M 8/14 (2006.01)
H01M 12/04 (2006.01)

(52) U.S. Cl.
CPC .............. C25B 11/035 (2013.01); C25B 1/34 (2013.01); C25B 1/46 (2013.01); C25B 11/0405 (2013.01); C25B 11/0426 (2013.01); C25B 11/0478 (2013.01); H01M 4/8605 (2013.01); H01M 4/8652 (2013.01); H01M 4/8668 (2013.01); H01M 4/88 (2013.01); H01M 4/8896 (2013.01); H01M 4/9041 (2013.01); H01M 4/96 (2013.01); H01M 8/083 (2013.01); H01M 12/06 (2013.01); H01M 8/146 (2013.01); H01M 12/04 (2013.01); H01M 2004/8689 (2013.01)

(58) Field of Classification Search
CPC ..... C25B 1/34; C25B 1/46; C25B 11/03–035; C25B 11/04; C25B 11/0405; C25B 11/0442; C25B 11/0478; H01M 4/86–9041

See application file for complete search history.

(56) References Cited

U.S. PATENT DOCUMENTS

| 8,093,176 | B2 | 1/2012 | Buchholz et al. | |
|---|---|---|---|---|
| 8,398,949 | B2 | 3/2013 | Meyer et al. | |
| 9,243,337 | B2 | 1/2016 | Turek et al. | |
| 2004/0197638 | A1 | 10/2004 | McElrath et al. | |
| 2006/0263232 | A1* | 11/2006 | Bulan | C25B 11/035 419/9 |
| 2009/0124705 | A1* | 5/2009 | Meyer | A61K 33/44 514/769 |
| 2011/0233071 | A1 | 9/2011 | Assmann et al. | |
| 2011/0318661 | A1* | 12/2011 | Uensal | H01M 4/8636 429/428 |
| 2012/0021302 | A1 | 1/2012 | Bulan et al. | |
| 2012/0115046 | A2* | 5/2012 | Mak | H01M 4/8605 429/405 |
| 2012/0252662 | A1 | 10/2012 | Assmann et al. | |
| 2014/0023939 | A1 | 1/2014 | Chen et al. | |
| 2015/0376803 | A1* | 12/2015 | Wang | H01M 4/8605 429/480 |
| 2017/0283964 | A1* | 10/2017 | Bulan | C25B 11/035 |

FOREIGN PATENT DOCUMENTS

| DE | 102005023615 A1 | 11/2006 |
|---|---|---|
| DE | 102009058833 A1 | 6/2011 |
| EP | 56004 A2 | 7/1982 |
| EP | 205556 A1 | 12/1986 |
| EP | 1728896 A2 | 12/2006 |

(Continued)

OTHER PUBLICATIONS

Chen et al ("Tribological behavior of carbon-nanotube-filled PTFE composites", Tribology Letters, vol. 15, No. 3, Oct. 2003, pp. 275-278) (Year: 2003).*

(Continued)

Primary Examiner — Alexander W Keeling
(74) Attorney, Agent, or Firm — Faegre Drinker Biddle & Reath LLP

(57) ABSTRACT

The invention relates to an oxygen-consuming electrode, in particular for use in chloralkali electrolysis, comprising a novel catalyst coating based on carbon nanotubes and a silver-based cocatalyst, and to an electrolysis device. The invention further relates to a method for producing said oxygen-consuming electrode and to the use thereof in chloralkali electrolysis or fuel cell technology.

18 Claims, No Drawings

(56) References Cited

FOREIGN PATENT DOCUMENTS

| EP | 2397578 A2 | 12/2011 | | |
|---|---|---|---|---|
| EP | 2410079 A2 * | 1/2012 | ........... | C25B 11/035 |
| GB | 1469930 A | 4/1977 | | |
| GB | 2487836 A | 8/2012 | | |
| WO | WO-8603455 A1 | 6/1986 | | |
| WO | WO-2007093337 A2 | 8/2007 | | |
| WO | WO-2009036877 A2 | 3/2009 | | |
| WO | WO-2010069490 A1 | 6/2010 | | |

OTHER PUBLICATIONS

International Search Report for PCT/EP2015/069723 dated Nov. 17, 2015.
International Search Report for PCT/EP2015/069726 dated Nov. 18, 2015.
Written Opinion of the International Searching Authority for PCT/EP2015/069723 dated Nov. 17, 2015.
Written Opinion of the International Searching Authority for PCT/EP2015/069726 dated Nov. 18, 2015.

* cited by examiner

OXYGEN-CONSUMING ELECTRODE AND METHOD FOR PRODUCING SAME

CROSS-REFERENCE TO RELATED APPLICATIONS

This application is a national stage application (under 35 U.S.C. § 371) of PCT/EP2015/069723, filed Aug. 28, 2015, which claims benefit of German Application No. 102014218367.7, filed Sep. 12, 2014, both of which are incorporated herein by reference in their entirety.

BACKGROUND OF THE INVENTION

The invention relates to an oxygen-depolarized electrode, in particular for use in chloralkali electrolysis, having a novel electrocatalyst coating and also an electrolysis apparatus. The invention further relates to a process for producing the oxygen-depolarized electrode and also its use in chloralkali electrolysis or fuel cell technology.

The invention proceeds from oxygen-depolarized electrodes which are known per se and are configured as gas diffusion electrodes and usually comprise an electrically conductive support and a gas diffusion layer having a catalytically active component. The invention proceeds in particular from oxygen-depolarized electrodes which comprise carbon modifications as electrocatalyst.

Oxygen-depolarized electrodes are a form of gas diffusion electrodes. Gas diffusion electrodes are electrodes in which the three states of matter, viz. solid, liquid and gaseous, are in contact with one another and the solid, electron-conducting catalyst catalyzes an electrochemical reaction between the liquid phase and the gaseous phase. The solid electrocatalyst is usually present in a porous film having a thickness in the range from about 200 μm to 500 μm.

Various proposals for operating the oxygen-depolarized electrodes in electrolysis cells of industrial size are known in principle from the prior art. The basic idea here is to replace the hydrogen-evolving cathode of the electrolysis (for example in chloralkali electrolysis) by the oxygen-depolarized electrode (cathode). An overview of the possible cell design and solutions may be found in the publication by Moussallem et al "Chlor-Alkali Electrolysis with Oxygen Depolarized Cathodes: History, Present Status and Future Prospects", J. Appl. Electrochem. 38 (2008) 1177-1194.

The oxygen-depolarized electrode, hereinafter also referred to as ODE for short, has to meet a series of fundamental requirements in order to be usable in industrial electrolyzers. Thus, the electrocatalyst and all other materials used have to be chemically stable toward the alkali metal hydroxide solution used, e.g. a sodium hydroxide solution having a concentration of about 32% by weight, and toward pure oxygen at a temperature of typically 80-90° C. A high measure of mechanical stability is likewise required, so that the electrodes can be installed and operated in electrolyzers having an area of usually more than 2 $m^2$ (industrial size). Further properties are: a high electrical conductivity, a high internal surface area and a high electrochemical activity of the electrocatalyst. Suitable hydrophobic and hydrophilic pores and an appropriate pore structure for conduction of gas and electrolyte are likewise necessary, as is impermeability so that, for example, gas space and liquid space remain separated from one another in an electrolyzer. Long-term stability and low production costs are further particular requirements which an industrially usable oxygen-depolarized electrode has to meet.

A further development direction for utilization of the ODE technology in chloralkali electrolysis is to place the ion-exchange membrane which separates the anode space from the cathode space in the electrolysis cell directly on the ODE. A sodium hydroxide solution gap is not present in this arrangement. This arrangement is also referred to as zero gap arrangement in the prior art. This arrangement is usually also employed in fuel cell technology. A disadvantage here is that the sodium hydroxide solution formed has to be conveyed through the ODE to the gas side and subsequently flows downward on the ODE. Here, blockage of the pores in the ODE by the sodium hydroxide solution or crystallization of sodium hydroxide in the pores must not occur. It has been found that very high sodium hydroxide concentrations can arise here, as a result of which the ion-exchange membrane is not stable in the long term to these high concentrations (Lipp et al, J. Appl. Electrochem. 35 (2005)1015—Los Alamos National Laboratory "Peroxide formation during chlor-alkali electrolysis with carbon-based ODC").

The use of inexpensive carbon materials such as carbon black or graphite as support material has to be avoided completely, in particular in the reduction of oxygen in an alkaline medium, because these generally promote the reaction according to reaction route (I) and thus lead to greatly reduced lives of the electrodes and to current yield losses (O. Ichinose et al. "Effect of silver catalyst on the activity and mechanism of a gas diffusion type oxygen cathode for chloralkali electrolysis", Journal of Applied Electrochemistry 34: 55-59 (2004)).

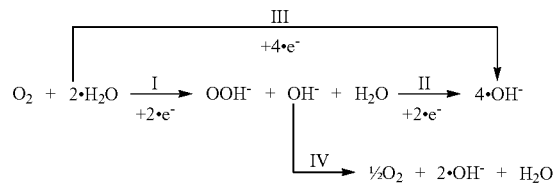

A disadvantage of the reduction of oxygen in an alkaline medium, where "in an alkaline medium" means, for example, a concentrated, in particular 32% strength by weight, sodium hydroxide solution, using an electrocatalyst, e.g. a catalyst in which silver supported on carbon black is present, and a temperature in the range from 60° C. to 90° C. is that the hydrogen peroxide formed as an intermediate degrades the carbon of the carbon black, resulting in formation of cracks in the electrode and to mechanical instability of the electrode and the electrode becoming unusable. Due to this "carbon corrosion", the supported electro catalyst likewise becomes detached from the support and the electrocatalyst thus becomes unusable.

It is likewise known (see O. Ichinose et al.) that the transfer of two electrons to oxygen can be avoided when silver is added to the carbon black; here, the step transferring four electrodes is preferred.

Similar effects also occur in the case of electrodes which are loaded with platinum and contain carbon black (L. Lipp "Peroxide formation in a zero-gap chlor-alkali cell with an oxygendepolarized cathode", Journal of Applied Electrochemistry 35:1015-1024 (2005)). It is also disclosed that part of the hydrogen peroxide formed can be reduced further to the desired hydroxide ions by application of higher voltages and/or higher current densities. The possibility of the sequence of reactions according to reaction route (I) and (II) is thus described. However, since the reaction according to reaction route (I) takes place, the reaction according to reaction route IV likewise cannot be prevented, which in turn leads to a reduction in the yield of hydroxide ions. The process variants disclosed (see L. Lipp et al., O. Ichinose et al.) thus have the same economic and technical disadvantages.

Carbon nanotubes (CNTs) have been generally known to those skilled in the art at least since they were described in 1991 by Iijima 5 (S. Iijima, Nature 354, 56-58, 1991). Since then, the term carbon nanotubes has referred to cylindrical bodies comprising carbon and having a diameter in the range from 3 to 80 nm and a length which is a multiple of, at least 10 times, the diameter. Furthermore, these carbon nanotubes are characterized by layers of ordered carbon atoms, with the carbon nanotubes normally having a core which differs in terms of the morphology. Synonyms for carbon nanotubes are, for example, "carbon fibrils" or "hollow carbon fibers" or "carbon bamboos" or (in the case of rolled structures) "nanoscrolls" or "nanorolls".

A further development in processes for the reduction of oxygen is the use of nitrogen-containing carbon modifications (P. Matter et al., "Oxygen reduction reaction activity and surface properties of nanostructured nitrogen-containing carbon", Journal of Molecular Catalysis A: Chemical 264: 73-81 (2007). Here, catalytic activity for the reduction of oxygen is obtained by catalytic deposition of vapors of acetonitrile on support materials such as silicon dioxide, magnesium oxide which in turn contain iron, cobalt or nickel as catalytically active component. The process for the reduction of oxygen is characterized in that it is carried out in a 0.5 molar sulfuric acid solution.

WO 2010069490 A1 describes the use of nitrogen-modified carbon nanotubes (NCNTs) for the reduction of oxygen in an alkaline medium. Here, no noble metal-containing catalysts are used. However, experiments have shown that the NCNT-based electrodes do not have a satisfactory long-term stability.

DE102009058833 A1 describes a process for producing nitrogen-modified CNTs, with from 2 to 60% by weight of metal nanoparticles having an average particle size in the range from 1 to 10 nm being present on the surface of the NCNTs. A disadvantage here is that the production method is very complicated.

Various methods which can fundamentally be divided into wet processes and dry processes are known for producing gas diffusion electrodes. In the dry process, e.g. as described in DE102005023615A1, the catalyst is milled together with a polymer, frequently PTFE, to give a mixture and the mixture is subsequently applied to a mechanical support element, for example silver or nickel mesh. The powder is subsequently compacted together with the support to form an electrode by pressing. e.g. by means of a roller compacter.

In contrast, in the wet process, e.g. as described in EP2397578A2, a suspension of catalyst and polymer component is produced. This is applied to the support material and subsequently dried and sintered (I. Moussallem, J. Jörissen, U. Kunz, S. Pinnow, T. Turek, "Chlor-alkali electrolysis with oxygen depolarized cathodes: history, present status and future prospects", J Appl. Electrochem. 2008, 38, 1177-1194).

BRIEF SUMMARY OF THE INVENTION

It was an object of the invention to provide a carbon-based gas diffusion electrode and a process for the production thereof, by means of which the reduction of oxygen can be carried out both in an acidic electrolyte (pH<6) and also in an alkaline electrolyte (pH>8) without hydrogen peroxide being formed as undesirable by-product, the reaction occurs with high current yields and the electrode has a satisfactory long-term stability.

It has surprisingly been found that electrodes which are stable in the long term are obtained when carbon nanotubes (CNTs) and a cocatalyst based on silver or silver oxide are mixed with a fluoropolymer by the present process according to the invention and the powder mixture obtained is subsequently pressed together with a support element. A further advantage of this electrocatalyst mixture is its surprisingly high effectiveness (further reduction of the voltage in the electrolysis of sodium chloride), especially in comparison with an electrocatalyst based only on silver. Silver-based electrodes are also costly to manufacture because of the notoriously high prices of noble metals.

DETAILED DESCRIPTION OF THE INVENTION

The invention provides a gas diffusion electrode for the reduction of oxygen, where the gas diffusion electrode has at least one sheet-like, electrically conductive support and a gas diffusion layer and electrocatalyst applied to the support, the gas diffusion layer consists at least of a mixture of carbon nanotubes and PTFE, the carbon nanotubes and fluoropolymer have been applied and compacted in powder form on the support and the carbon nanotubes act as electrocatalyst, characterized in that from 1 to 55% by weight, preferably from 2 to 35% by weight, of silver-containing cocatalyst, based on the total content of catalyst and fluoropolymer, is present as further electrocatalyst.

In a preferred embodiment of the invention, the carbon nanotubes used are substantially free of nitrogen constituents. That is to say, the proportion of nitrogen in the form of chemically bound nitrogen in the carbon nanotubes is less than 0.5% by weight, preferably less than 0.3% by weight, particularly preferably less than 0.2% by weight. This is important since it has been observed that a higher proportion of chemically bound nitrogen, for example in the case of the NCNTs known from the prior art, can lead to swelling of the electrode material under the electrolysis conditions. Such electrodes will not have the required long-term stability. The nitrogen content can be determined by means of a commercial CHN analyzer based on the principle of combustion of the sample at 950° C. in pure oxygen and detection of the nitrogen given off by means of a thermal conductivity detector.

The silver-containing cocatalyst preferably consists of silver, silver oxide or a mixture of silver and silver oxide, preferably of silver, with the silver oxide preferably being silver(I) oxide.

For the purposes of the invention and as in the prior art, the term carbon nanotubes is used to refer to usually mainly cylindrical carbon tubes having a diameter in the range from 1 to 100 am and a length which is a multiple of the diameter. These tubes consist of one or more layers of ordered carbon atoms and have a core which differs in terms of the morphology. These carbon nanotubes are also referred to as, for example, "carbon fibrils" or "hollow carbon fibers".

Carbon nanotubes have been known for a long time in the technical literature. Although Iijima (publication: S. Iijima, Nature 354, 56-58, 1991) is generally being credited with being the discoverer of carbon nanotubes (also referred to as nanotubes or CNT for short), these materials, in particular fibrous graphite materials having a plurality of graphene layers, have been known since the 1970s and early 1980s.

Tates and Baker (GB 1469930A1, 1977 and EP 0056 004A2, 1982) firstly described the deposition of very fine, fibrous carbon from the catalytic decomposition of hydrocarbons. However, the carbon filaments produced on the basis of short-chain hydrocarbons were not characterized further in respect of their diameter.

The production of carbon nanotubes having diameters of less than 100 nm was described for the first time in EP 205 556B1 and WO 86/03455A1. These carbon nanotubes are produced using light (i.e. short- and medium-chain aliphatic or monocyclic or bicyclic aromatic) hydrocarbons and an iron-based catalyst over which carbon carrying compounds are decomposed at a temperature above 800-900° C.

The methods known today for producing carbon nanotubes encompass electric arc, laser ablation and catalytic processes. In many of these processes, soot, amorphous carbon and fibers having large diameters are formed as by-product. Among the catalytic processes, a distinction can be made between deposition of introduced catalyst particles and the deposition of metal centers which are formed in-situ and have diameters in the nanometer range (known as flow processes). In production by catalytic deposition of carbon from hydrocarbons which are gaseous under the reaction conditions (hereinafter CCVD; catalytic carbon vapor deposition), acetylene, methane, ethane, ethylene, butane, butene, butadiene, benzene and further carbon-containing starting materials have been mentioned as possible carbon carriers.

The catalysts generally comprise metals, metal oxides or decomposable or reducible metal components. As possible metals for catalysts, the prior art makes mention by way of example of Fe, Mo, Ni, V, Mn, Sn, Co, Cu and others. The individual metals usually do have, even alone, a tendency to catalyze the formation of carbon nanotubes. However, according to the prior art, high yields of carbon nanotubes and small proportions of amorphous carbon are advantageously achieved using metal catalysts which contain a combination of the abovementioned metals.

Particularly advantageous catalyst systems are based, according to the prior art, on combinations containing Fe, Co or Ni. The formation of carbon nanotubes and the properties of the tubes formed depend in a complex way on the metal component or combination of a plurality of metal components used as catalyst, the support material used and the interaction between catalyst and support, the feed gas and feed gas partial pressure, admixture of hydrogen or further gases, the reaction temperature and the residence time and the reactor used. Optimization is a particular challenge for an industrial process.

It may be remarked that the metal component used in CCVD and referred to as catalyst is consumed during the course of the synthesis process. This consumption is attributable to deactivation of the metal component, e.g. due to deposition of carbon on the entire particle, which leads to complete covering of the particle (this is known as "encapping" to those skilled in the art). Reactivation is generally not possible or not economically feasible. Often, only not more than a few gram of carbon nanotubes are obtained per gram of catalyst, with the catalyst here encompassing the totality of support and active catalyst metal(s) used. Owing to the indicated consumption of catalyst and owing to the economic outlay involved in separating the catalyst residue from the finished carbon nanotube product, a high yield of carbon nanotubes based on the catalyst used represents an important requirement which catalyst and process have to meet.

Usual structures of carbon nanotubes are those of the cylinder type (tubular structure). Among cylindrical structures, a distinction is made between single-wall carbon nanotubes (SWCNT) and multiwall carbon nanotubes (MW-CNT). Conventional processes for producing these are, for example, electric arc processes (arc discharge), laser ablation, chemical vapor deposition (CVD process) and catalytic chemical vapor deposition (CCVD).

Such cylindrical carbon nanotubes can likewise be produced by an electric arc process. Iijima (Nature 354, 1991, 56-8) reports the formation of carbon nanotubes which consist of two or more graphene layers which are rolled up to form a seamlessly closed cylinder and are nested in one another in an electric arc process. Depending on the rolling-up vector, chiral and achiral arrangements of the carbon atoms along the longitudinal axis of the carbon fiber are possible.

The process described in WO 2009/036877A2 makes it possible to produce, for example, carbon nanotubes which have a scroll structure in which one or more graphite layers consisting of two or more superposed graphene layers form a rolled structure.

Further known structures of carbon nanotubes are described in a review article by Milne et al. (Milne et al., Encyclopedia of Nanoscience and Nanotechnology, 2003, Volume X, S. 1-22; ISBN 1-58883-001-2). These structures are the "herringbone" structure, the cup-stacked structure and the stacked structure, the bamboo structure and the platelet structure. Carbon nanofibers can likewise be produced by means of electrospinning of polyacrylonitrile and subsequent graphitization (Jo et al., Macromolecular Research, 2005, Vol. 13, pp. 521-528).

Although all the abovementioned types of carbon nanotubes can in principle be employed for the novel production process, preference is given to carbon nanotubes which have a scroll structure as described above. An advantage of the specific CNT types is their formation of agglomerates in the micron range, which can be processed with fewer problems than powder. The use of such CNT agglomerates is therefore preferred in the production of gas diffusion electrodes by the dry process.

The nitrogen-containing carbon nanotubes known from the prior art lead, when processed with PTFE, to gas diffusion electrodes which in practical operation displayed a usable cell voltage when operated as oxygen-depolarized electrode in chloralkali electrolysis for only a few hours and then rapidly led to a tremendous voltage increase. Such an electrode material based on nitrogen-containing carbon nanotubes is unusable in practice.

In a preferred embodiment of the gas diffusion electrode, the mixture of firstly carbon nanotubes and cocatalyst and secondly fluoropolymer, in particular PTFE, contains from 1 to 70% by weight, preferably from 5 to 65% by weight, particularly preferably from 10 to 55% by weight, of fluoropolymer and 99-30% by weight, preferably 95-35% by weight, particularly preferably from 90 to 45% by weight, of carbon nanotubes and cocatalyst.

When the content of fluoropolymer is too low, the electrode can become mechanically unstable since the bonding action due to the fluoropolymer is absent. If the content of fluoropolymer is too high, the electrode material may lack the required electrical conductivity.

In a further preferred embodiment of the gas diffusion electrode, the weight ratio of silver-containing cocatalyst to carbon nanotubes is from 1:98 to 55:40, preferably from 1:95 to 30:65.

In a preferred process, the mixture of carbon nanotubes, cocatalyst and fluoropolymer is applied as powder mixture to the support element.

In a further preferred embodiment, the cocatalyst is supported on an inert catalyst support, in particular a catalyst support based on zirconium oxide, carbon or nickel.

As preferred material of the carbon nanotubes, use is made of carbon nanotubes in the form of an agglomerate, with at least 95% by weight of the agglomerate particles having an external diameter in the range from 30 µm to 5000 µm, preferably from 50 µm to 3000 µm and particularly preferably from 100 µm to 1000 µm. The external diameter is, for example, determined by means of laser light scattering (in accordance with ISO 13320:2009) on an aqueous dispersion without use of ultrasound, for which purpose the measured cumulated volume distribution curve is employed.

Such a material is easier to handle in dry processing than more finely divided CNT powder. An advantage of such an agglomerate is the less hazardous processing of the CNT powder material, since this does not tend to form dust. It is also advantageous for the agglomerates to be maintained during the production of the powder mixture. In a preferred embodiment, the finished electrode therefore also has the CNT agglomerates in the abovementioned diameter distribution.

Preference is also given to an embodiment of the gas diffusion electrode in which the carbon nanotubes have a content of catalyst residues of the catalyst used for producing the carbon nanotubes, in particular a content of transition metals, particularly preferably of manganese and/or iron and/or cobalt, of less than 1% by weight, in particular less than 0.5% by weight, particularly preferably not more than 0.3% by weight. This is, for example, achieved by the carbon nanotubes being washed with acids and isolated before processing to give the powder mixture.

The abovementioned catalyst residues can be leached from the CNT material during the electrolysis and contaminate the electrolysis products when unpurified carbon nanotubes are used.

The invention further provides a process for producing a gas diffusion electrode for the reduction of oxygen, in particular a novel gas diffusion electrode as described above, where the gas diffusion electrode has at least one sheet-like, electrically conductive support and a gas diffusion layer and electrocatalyst applied to the support and the gas diffusion layer consists at least of a mixture of carbon nanotubes and fluoropolymer, in particular PTFE, with the carbon nanotubes forming the electrocatalyst, characterized in that the carbon nanotubes and the fluoropolymer are dry mixed together with a further electrocatalyst (cocatalyst) in powder form and then applied to the support and compacted with application of a pressing force, where from 1 to 55% by weight, preferably from 2 to 35% by weight, of silver-containing cocatalyst, based on the total content of catalyst and fluoropolymer, is used as further electrocatalyst (cocatalyst).

In a further preferred embodiment of the process, a pulverulent fluoropolymer having an average particle size (d50) in agglomerated form of from 100 µm to 1 mm, preferably from 150 µm to 0.8 mm and particularly preferably from 200 µm to 400 µm, is used as fluoropolymer, in particular polytetrafluoroethylene (PTFE).

The particle size in agglomerated form is determined, for example, by means of laser light scattering on a dry sample dispersed in air or inert gas. The d50 (also median value) of the measured cumulated volume distribution curve is employed as the average particle size.

The processing of carbon nanotubes, cocatalyst and fluoropolymer as powders is preferably carried out by dry mixing of the powders to give a homogeneous mixture.

As polymer component, particular preference is given to using a high molecular weight polytetrafluoroethylene (PTFE), e.g. PTFE powder from Dyneon, grade 2053, having a particle size d50 of about 230 µm. However, it is also possible to use other PTFE powders.

The mixing process is preferably carried out in two phases: a first phase with low shear at low temperature and a second phase at high shear and elevated temperature. This preferred mode of operation is characterized in that the dry mixing in the first phase is carried out until a homogeneous premix is obtained, with the temperature of the mixture being not more than 25° C., preferably not more than 20° C.

The preferred procedure is, in the second phase, particularly preferably carried out using mixers which have fast-running beating tools, e.g. the mixer from Eirich, model R02, equipped with a star whirler as mixing element which is operated at a speed of rotation of 5000 rpm. In contrast to the prior art, e.g. in DE102005023615A mixing in the second phase should, in the preferred mode of operation of the mixing process, be carried out at a temperature of more than 30° C. after a homogeneous premix has been obtained from the first phase. A mixing temperature of at least 30° C., particularly preferably from 30° C. to 80° C., very particularly preferably from 35° C. to 70° C., in particular from 40° C. to 60° C., is therefore preferred. Since no heating occurs during the mixing process, the powder mixture should be heated before introduction into the mixer and/or the mixing vessel should be heated to the required temperature. Preference is given to using mixers which have a double-walled mixing vessel.

The powder mixture produced is subsequently sprinkled onto the support element, for example using the procedure described in DE102005023615A.

The support of the gas diffusion electrode is preferably configured as mesh, nonwoven, foam, woven fabric, braid or expanded metal. The support preferably consists of carbon fibers, nickel, silver or nickel coated with noble metal, with the noble metal preferably being selected from among one or more of the group: silver, gold and platinum. The support is particularly preferably formed by gold-coated nickel. This keeps the contact resistance to the electrocatalyst low.

The sprinkling of the powder mixture onto the support element can, for example, occur through a sieve. A frame-like template is particularly advantageously placed on the support element, with the template preferably being selected so that it just surrounds the support element. As an alternative, the template can also be made smaller than the area of the support element. In this case, an uncoated margin of the support element remains free of electrochemically active coating after sprinkling-on of the powder mixture and pressing together with the support element. The thickness of the template can be selected according to the amount of powder mixture to be applied to the support element. The template is filled with the powder mixture. Excess powder can be removed by means of a scraper. The template is then removed. However, a layer thickness of typically more than 2 mm is produced here, in contrast to the prior art. Thus, layer thicknesses of the abovementioned powder mixture of preferably from 1 to 10 mm, preferably from 3 to 8 mm, are produced by the novel process.

The layers are, for example, produced by means of a template, and excess powder is removed by means of scrapers.

The powder layer is subsequently compacted in particular by a factor of from 2 to 10. The compaction ratio describes the ratio of the thickness of the compacted CNT-PTFE powder mixture on the support element to the bulk density of the powder mixture. The support element is not taken into account in the calculation.

The bulk density of the powder mixture is, for example, determined as follows. The powder mixture which has been sieved through a sieve having a mesh opening of 1 mm is introduced into a 500 ml measuring cylinder and subsequently weighed. The bulk density is calculated from the volume and the mass. Here, the powder is not loaded mechanically, and the measuring cylinder is also not firmly set down or mechanically loaded, so that no compaction or densification can occur.

The compaction of the powder mixture which has been sprinkled on the support element and struck off can be effected by pressing or by roller compacting. The preferred method is roller compacting. A particularly preferred process for producing the gas diffusion electrode is therefore characterized in that compaction is carried out by means of rollers, with the linear pressing force applied by the roller(s) used to the support element and sprinkled-on powder mixture preferably being from 0.1 to 1 kN/cm, preferably from 0.2 to 0.8 kN/cm.

Rolling is preferably carried out at a constant ambient temperature of the manufacturing rooms, in particular at a temperature of not more than 20° C.

The gas diffusion electrode can, in particular, have the gas diffusion layer produced by compacting of the CNT/Ag/fluoropolymer powder mixture on one or both sides of the sheet-like support. The gas diffusion layer is particularly preferably applied on one side to a surface of the support element.

The thickness of the finished gas diffusion electrode after compaction is preferably from 0.2 to 3 mm, preferably from 0.2 to 2 mm, particularly preferably from 0.2 to 1 mm.

The porosity of the ODE is from 70 to 90%. The porosity is calculated from the ratio of the solids volume to the empty volume in the gas diffusion electrode. Here, the solids volume of the gas diffusion electrode is calculated from the sum of the volumes of the components added. The volume of the gas diffusion electrode without the support element is determined from the density of the composition of the gas diffusion electrode. When the solids volume is subtracted from the volume of the gas diffusion electrode, the empty volume of the gas diffusion electrode is obtained. The ratio of empty volume to volume of the gas diffusion electrode gives the porosity. Preference is also given to a novel gas diffusion electrode as described above which has been obtained by an inventive production process as described above.

The invention therefore further provides for the use of the novel gas diffusion electrode for the reduction of oxygen in the presence of alkaline electrolytes, e.g. sodium hydroxide solution, in particular in an alkaline fuel cell, use in mains water treatment, for example for producing sodium hypochlorite as bleaching solution or use in chloralkali electrolysis, in particular for the electrolysis of LiCl, KCl or NaCl.

The novel ODE is particularly preferably used in chloralkali electrolysis and here particularly in the electrolysis of sodium chloride (NaCl).

The invention further provides an electrolysis apparatus, in particular for chloralkali electrolysis, having a novel gas diffusion electrode as described above as oxygen-depolarized cathode.

The invention is illustrated below by the examples, but without these constituting a restriction of the invention.

EXAMPLES

Example 1 (Comparative Example)

The production of an electrode is described below.

15 g of a powder mixture, consisting of 40% by weight of PTFE powder Dyneon grade TF2053Z and 60% by weight of CNT powder (produced as described in WO 2009/036877A2, example 2), average agglomerate diameter about 450 μm (d50 by means of laser light scattering), bulk density about 200 g/l, content of residual catalyst (Co and Mn) about 0.64% by weight and a nitrogen content of 0.18% by weight, was premixed in a first phase at a temperature of about 19° C. to give a homogeneous mixture and then heated to 50° C. in a drying oven and introduced into a mixer from IKA which had been preheated to 50° C. The IKA mixer was equipped with a star whirler as mixing element and was operated at a speed of rotation of 15 000 rpm. The mixing time in the second phase of the mixing process was 60 seconds, with mixing being interrupted after every 15 seconds to detach material on the wall. The temperature of the powder mixture after the second mixing phase was 49.6° C. Heating of the powder during the mixing process was not observed. The powder mixture was cooled to room temperature. After cooling, the powder mixture was sieved using a sieve having a mesh opening of 1.0 mm. The powder mixture had a bulk density of 0.0975 $g/cm^3$.

The sieved powder mixture was subsequently applied to a mesh made of gilded nickel wires having a wire thickness of 0.14 mm and a mesh opening of 0.5 mm. Application was carried out with the aid of a 4 mm thick template, with the powder being applied using a sieve having a mesh opening of 1 mm. Excess powder projecting above the thickness of the template was removed by means of a scraper. After removal of the template, the support element with the applied powder mixture was pressed by means of a roller press at a pressing force of 0.45 kN/cm. The gas diffusion electrode was taken from the roller press. The density of the electrode without the support element was 0.5 $g/cm^3$, giving a compaction ratio of 5.28. The thickness of the finished electrode was 0.6 mm.

The oxygen-depolarized cathode (ODC) produced in this way was installed in a laboratory electrolysis cell with an active area of 100 $cm^2$ and operated under the conditions of chloralkali electrolysis. An ion-exchange membrane from DuPONT, type N982WX, was used here. The sodium hydroxide gap between ODC and membrane was 3 mm. A titanium anode consisting of expanded metal having a commercial DSA® Coating for chlorine production from Denora was used as anode. The cell voltage at a current density of 4 $kA/m^2$, an electrolyte temperature of 90° C., a sodium chloride concentration of 210 g/l and a sodium hydroxide concentration of 32% by weight was on average 2.20 V. The experiment could be operated for 120 days without an increase in voltage.

Example 2 Comparative Example—Carbon Black—Support Element Silver Mesh

The production of the electrode was carried out as described in example 1, but Vulcan carbon black grade XC72R from Cabot was used instead of the CNTs.

The cell voltage was 2.20 V at the beginning of the experiment and remained constant for 7 days. After the 7th day, the cell voltage increased continuously by 16 mV every day. On the 19th day of operation, the cell voltage was 2.40 V. This means that this material does not have long-term stability.

Example 3 (Comparative Example—Use of Nitrogen-Doped Carbon Nanotubes

Nitrogen-modified carbon nanotubes NCNTs were produced by means of a catalyst as described in WO2007/093337A2 (example 1, catalyst 1), which was introduced into a fluidized-bed reactor (diameter 100 mm). 60 g of the catalyst and 200 g of NCNTs (from a preliminary experiment) were firstly introduced into the reactor and reduced at 750° C. in a stream of 27 liters/minute of hydrogen and 3 liters/minute of nitrogen for 30 minutes, before the hydrogen stream was switched off, the nitrogen stream was increased to 21.5 liters/minute and the introduction of pyridine at a feed rate of 30 g per minute was commenced at the same time and carried on for a time of 30 minutes, likewise at 750° C. After cooling, about 400 g of NCNTs having a nitrogen content of 5.1% by weight were obtained. Further NCNT materials were produced analogously, and a mixture of at least 2 NCNT production batches was subsequently produced and then used for electrode production.

The NCNTs produced in this way were processed by the process described above in example 1 to give a gas diffusion electrode and this was measured in a cell. The electrodes produced in this way were characterized in a half cell measurement.

Measurement of the electrode is carried out in a half cell from Gaskatel, the result of which is a potential relative to the reverse hydrogen reference electrode (RHE). The half cell measurement was carried out at 80° C. using 32% strength by weight sodium hydroxide solution as electrolyte. A platinum foil was used as counterelectrode. The potential measurement was carried out against the reverse hydrogen electrode (RHE) from Gaskatel (Hydroflex). The measurement was carried out using a potentiostat IM6 from Zahner. Evaluation was carried out by means of a CPE model. The potential was corrected by the ohmic losses. The potential of the half cell was 387 mV vs RHE.

Examples 4 to 12

Electrodes having different compositions in respect of the electrocatalyst were produced in a similar way to the procedure in example 1. However, a proportion of 20% by weight of PTFE was used instead of a proportion of 40% by weight of PTFE and 80% by weight of CNT was used instead of 60% by weight of CNT (comparative example 4), with the difference that the CNTs used for example 4 were specially cleaned in order to remove the residual content of catalyst from the fluidized-bed production. The purified CNT material had a residual content of CNT catalyst (Co and Mn) of 0.02% by weight. The CNTs used had an N content of 0.15% by weight. For comparison, the proportion of CNT of 80% by weight was replaced stepwise by increasing proportions of silver in further examples (examples 5 to 12). The content of PTFE, CNT and silver is shown in table 1 below:

TABLE 1

| Example | Silver (% by wt.) | PTFE (% by wt.) | CNT (% by wt.) | Half cell potential |
|---|---|---|---|---|
| 4 | 0 | 20 | 80 | 664 |
| 5 | 1 | 20 | 79 | 690 |
| 6 | 4 | 20 | 76 | 723 |
| 7 | 8 | 20 | 72 | 714 |
| 8 | 10 | 20 | 70 | 718 |
| 9 | 12 | 20 | 68 | 734 |
| 10 | 16 | 20 | 64 | 701 |
| 11 | 25 | 20 | 55 | 706 |
| 12 | 50 | 20 | 30 | 692 |

A potential measurement as described in example 3 was carried out using these electrodes. The average measured values are likewise shown in table 1.

Comparison of the silver-containing specimens (examples 5 to 12) with the electrodes containing only CNT as electrocatalyst (comparative example 4) surprisingly indicates that even a comparatively small proportion of silver as cocatalyst in addition to the CNT leads to an over proportional increase in the activity, here noticeable from a comparatively higher potential. However, a further increase in the silver content beyond the proportion according to the invention (i.e. greater than 55% by weight) tends to give a worsening of the electrode quality.

The invention claimed is:

1. A gas diffusion electrode for the reduction of oxygen, where the gas diffusion electrode has at least one sheet-like, electrically conductive support, and a gas diffusion layer and an electrocatalyst applied to the support,
    wherein the gas diffusion layer consists of at least a mixture of carbon nanotubes and a fluoropolymer,
    wherein the carbon nanotubes and the fluoropolymer are dry mixed together with a silver-containing cocatalyst in powder form and then applied to the support and compacted with an application of a pressing force on the support and,
    wherein the carbon nanotubes act as the electrocatalyst, wherein from 1 to 55% by weight of the silver-containing cocatalyst, based on the total content of the electrocatalyst, the silver-containing cocatalyst, and the fluoropolymer, is present as a further electrocatalyst.

2. The gas diffusion electrode as claimed in claim 1, wherein the mixture of the carbon nanotubes, the silver containing cocatalyst, and the fluoropolymer contains from 1 to 70% by weight of the fluoropolymer and 99-30% by weight of the carbon nanotubes and the silver containing cocatalyst.

3. The gas diffusion electrode as claimed in claim 1, wherein the weight ratio of the silver-containing cocatalyst to the carbon nanotubes is from 1:98 to 55:40.

4. The gas diffusion electrode as claimed in claim 1, wherein the electrode has a thickness of from 0.2 to 3 mm.

5. The gas diffusion electrode as claimed in claim 1, wherein the porosity of the electrode is from 70 to 90%.

6. The gas diffusion electrode as claimed in claim 1, wherein the silver containing cocatalyst consists of silver, silver oxide or a mixture of silver and silver oxide.

7. The gas diffusion electrode as claimed in claim 1, wherein the gas diffusion layer has been applied on one side or two sides of the support.

8. The gas diffusion electrode as claimed in claim 1, wherein the carbon nanotubes have a content of catalyst residues of a catalyst used for producing the carbon nanotubes of less than 1% by weight.

9. The gas diffusion electrode as claimed in claim 1, wherein the carbon nanotube powder is present as an agglomerate, with at least 95% by weight of the agglomerate particles having an external diameter in the range from 30 µm to 5000 µm.

10. The gas diffusion electrode as claimed in claim 1, wherein support is configured as mesh, nonwoven, foam, woven fabric, braid or expanded metal.

11. The gas diffusion electrode as claimed in claim 1, wherein the support consists of carbon fibers, nickel, silver or nickel coated with noble metal.

12. A process for producing a gas diffusion electrode as claimed in claim 1, where the gas diffusion electrode has at least one sheet-like, electrically conductive support, and a gas diffusion layer and an electrocatalyst applied to the support,
- wherein the gas diffusion layer consists at least of a mixture of carbon nanotubes and a fluoropolymer, with the carbon nanotubes acting as the electrocatalyst,
- wherein the carbon nanotubes and the fluoropolymer are dry mixed together with a silver containing cocatalyst in powder form and then applied to the support and compacted with application of a pressing force,
- wherein from 1 to 55% by weight of the silver-containing cocatalyst, based on the total content of the electrocatalyst, the silver containing cocatalyst, and the fluoropolymer, is used as cocatalyst.

13. The process as claimed in claim 12, wherein the dry mixing is carried out in a first phase to give a homogeneous premix, with the temperature of the mixture being not more than 25° C.

14. The process as claimed in claim 13, wherein the dry mixing is carried out in a second phase using mixing tools after the homogeneous premix has been obtained from the first phase, with the temperature of the powder mixture being at least 30° C.

15. The process as claimed in claim 12, wherein compaction is carried out by means of rollers in a roller apparatus, with the linear pressing force applied by the rollers to the support and the powder mixture is from 0.1 to 1 kN/cm.

16. The process as claimed in claim 15, wherein the rolling is carried out at a constant ambient temperature.

17. A method comprising utilizing the gas diffusion electrode as claimed in claim 1 as an oxygen-depolarized electrode for the reduction of oxygen in an alkaline medium or as an electrode in an alkaline fuel cell or as electrode in a metal/air battery.

18. An electrolysis apparatus having a gas diffusion electrode as claimed in claim 1 as an oxygen-depolarized cathode.

* * * * *